US009432239B2

(12) United States Patent
Olson et al.

(10) Patent No.: US 9,432,239 B2
(45) Date of Patent: *Aug. 30, 2016

(54) END-POINT IDENTIFIERS IN SIP

(71) Applicant: Microsoft Technology Licensing, LLC, Redmond, WA (US)

(72) Inventors: Sean C. Olson, Kirkland, WA (US); Jeremy T. Buch, Redmond, WA (US); Ajay P. Chitturi, Bellevue, WA (US); David J. Simons, Redmond, WA (US); Nikhil P. Bobde, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,280

(22) Filed: Mar. 19, 2013

(65) Prior Publication Data

US 2014/0040484 A1    Feb. 6, 2014

Related U.S. Application Data

(63) Continuation of application No. 13/221,620, filed on Aug. 30, 2011, now Pat. No. 8,402,146, which is a continuation of application No. 12/169,584, filed on Jul. 8, 2008, now Pat. No. 8,024,470, which is a continuation of application No. 10/387,238, filed on Mar. 12, 2003, now Pat. No. 7,412,521.

(51) Int. Cl.
*G06F 15/16* (2006.01)
*H04L 29/06* (2006.01)
*H04L 29/12* (2006.01)

(52) U.S. Cl.
CPC ... *H04L 29/06197* (2013.01); *H04L 29/06027* (2013.01); *H04L 29/12009* (2013.01); *H04L 29/12207* (2013.01); *H04L 29/12594* (2013.01); *H04L 61/20* (2013.01); *H04L 61/3085* (2013.01); *H04L 65/1006* (2013.01)

(58) Field of Classification Search
CPC ............ H04L 29/06197; H04L 61/20; H04L 61/3085; H04L 65/1006; H04L 29/12594; H04L 29/12009; H04L 29/12207; H04L 29/122
USPC ................. 709/200–203, 217–227, 228, 229
See application file for complete search history.

(56) References Cited

U.S. PATENT DOCUMENTS

| 6,185,606 B1 | 2/2001 | Bereiter |
| 6,765,921 B1 | 7/2004 | Stacey et al. |
| 6,775,277 B1 * | 8/2004 | Li et al. ........................ 370/389 |
| 6,822,957 B1 | 11/2004 | Schuster et al. |

(Continued)

OTHER PUBLICATIONS

Rosenberg et al., "SIP: Session Initiation Protocol," RFC 3261, Network Working Group, Jun. 2002.

*Primary Examiner* — Moustafa M Meky
(74) *Attorney, Agent, or Firm* — Merchant & Gould P.C.

(57) ABSTRACT

A system and method for uniquely identifying an SIP device extends the SIP communications protocol with an end point identifier, carried for example in the header of an SIP transmission. The end point identifier is useful for routing, registration, subscription, and authentication. The end point (device) of a given user epid can be uniquely identified by creating a key from an epid and a user's address-of-record (URI). This in turn enables improved connection management and security association management when the connections/IP addresses are transient, such as when HTTPS tunneling is used.

20 Claims, 6 Drawing Sheets

(56) References Cited

U.S. PATENT DOCUMENTS

| | | |
|---|---|---|
| 6,988,143 B2 | 1/2006 | O'Neill et al. |
| 7,050,423 B2 | 5/2006 | Schneider et al. |
| 7,068,769 B1 | 6/2006 | Weaver et al. |
| 7,085,813 B2 | 8/2006 | Huh et al. |
| 7,177,642 B2 | 2/2007 | Sanchez Herrero et al. |
| 7,184,418 B1 | 2/2007 | Baba et al. |
| 7,412,521 B2 | 8/2008 | Olson et al. |
| 7,480,915 B2 * | 1/2009 | Costa Requena et al. ... 719/311 |
| 7,624,266 B2 | 11/2009 | Gabor |
| 7,801,157 B2 * | 9/2010 | Li et al. ........................ 370/401 |
| 8,024,470 B2 | 9/2011 | Olson et al. |
| 8,402,146 B2 | 3/2013 | Olson et al. |
| 2002/0071427 A1 | 6/2002 | Schneider et al. |
| 2002/0085549 A1 | 7/2002 | Reza et al. |
| 2002/0091769 A1 * | 7/2002 | Drozdzewicz et al. ...... 709/204 |
| 2002/0142770 A1 | 10/2002 | Goldberg et al. |
| 2003/0012170 A1 | 1/2003 | Vassilovski et al. |
| 2003/0048195 A1 | 3/2003 | Trossen |
| 2003/0086411 A1 | 5/2003 | Vassilovski |
| 2003/0187992 A1 | 10/2003 | Steenfeldt et al. |
| 2003/0212803 A1 * | 11/2003 | Wu et al. ...................... 709/228 |
| 2003/0212809 A1 * | 11/2003 | Wu et al. ...................... 709/231 |
| 2003/0217174 A1 | 11/2003 | Dorenbosch et al. |
| 2003/0233457 A1 | 12/2003 | Basilier et al. |
| 2004/0068574 A1 | 4/2004 | Costa Requena et al. |
| 2004/0203710 A1 | 10/2004 | Gabor et al. |
| 2005/0008005 A1 * | 1/2005 | Li et al. ........................ 370/352 |

\* cited by examiner

END-POINT IDENTIFIERS IN SIP

CROSS-REFERENCES TO RELATED APPLICATIONS

This application is a continuation of application Ser. No. 13/221,620, filed Aug. 30, 2011, which is a continuation of application Ser. No. 12/169,584, filed Jul. 8, 2008, now U.S. Pat. No. 8,024,470, which is a continuation of application Ser. No. 10/387,238, filed Mar. 12, 2003, now U.S. Pat. No. 7,412,521, which applications are incorporated herein by reference in their entirety.

AREA OF THE INVENTION

The present invention relates generally to communication between devices over a computer network, and more particularly, to enabling identification and authentication of endpoint devices across the computer network.

BACKGROUND OF THE INVENTION

The Session Initiation Protocol (SIP) is a signaling protocol that provides a mechanism for a computing device to locate another device it wants to communicate with over a computer network and to establish a communication session therewith. In particular, SIP is an Internet Engineering Task Force (IETF) standard protocol for initiating interactive user-sessions in a number of scenarios. For example, SIP is used for Internet conferencing, telephony, gaming, virtual reality, event notification, and instant messaging. The SIP protocol enables call setup initiation, routing, authentication and other feature messages to endpoints within an IP domain.

Like HTTP or SMTP, SIP works in the Application Layer of the Open Systems Interconnection (OSI) communications model. As such, SIP can establish multimedia sessions or Internet telephony calls, and modify or terminate them. The SIP protocol can also invite participants to unicast or multicast sessions that do not necessarily involve the initiator. Because the SIP supports name mapping and redirection services, users initiate and receive communications and services from any location and networks are capable of identifying users within the network.

Although SIP has been widely implemented for various applications, the current SIP protocol has a deficiency whereby there is no unique identifier for a device carried in the SIP signal. The standard SIP solution is to use the device's IP address, however, this is not an adequate solution because in many situations the device itself remains the same yet the device's IP address changes, as in the case of a reboot.

As such, it is desirable to identify endpoint devices which are involved in a security association (SA) (i.e., a point to point association which is not shared across multiple devices for a user). In particular, tying the SA to the IP-level communication address means the SA is lost when the communication address changes dynamically. Having a unique identifier would make it possible to re-use an existing SA for situations where the device and user credentials have not changed.

It is also desirable to support independent send and receive communication addresses as in the case of using TCP as a transport wherein it is typical to use different send and receive ports. Because of the difference in the ports, the combination of IP address and port is not suitable for uniquely identifying the device and a single device would be perceived as having two different identities. Using the IP address alone precludes the ability to have two different SIP stacks on the same node. As such, having a unique device identifier would enable independent send and receive communication addresses.

It is further desirable to distinguish between multiple and single point of presence for a user as in the case where a registrar/presence agent server chooses to enforce policies that restrict a user to having only a single point of presence. In such a situation, a unique device identifier would be beneficial in allowing the registrar to distinguish when a user has registered multiple clients versus when a user has registered the same client multiple times with a different communication address.

It is still further desirable to allow routing of a request to one of several devices belonging to a particular user. In particular, it is desirable to allow the originator of the request to target a specific destination device and to allow a device to specify that future communications within a dialog should go directly to that device even in situations where the communication address for that device changes over time.

It is yet further desirable to support reliable communications over potentially transient HTTPS connections. Because a unique device identifier is useful for identifying peers in a TLS connection, the remote end of this connection can use the device identifier to determine the appropriate connection to use when forwarding messages, even when the connection is broken and re-established. Similarly, it is desirable to use the unique device identifier to manage a reboot/restart of a client such that changes in the communication address are differentiated from changes in the device.

Thus, there is a need to extend the SIP signaling protocol for the purpose of adding an identifier for use in uniquely identifying the end-point device to overcome these and other obstacles.

SUMMARY OF THE INVENTION

In view of the foregoing, the present invention provides a new scheme for uniquely identifying a SIP device by extending the SIP communications protocol. The extension involves a parameter typically carried in the header of the SIP signal. The extension, referred to as the "End Point Identifier" or "epid," impacts the routing, registration, subscription, and authentication logic in the client, proxy, and server. The end point (device) of a given user epid can be uniquely identified by creating a key from an epid and a user's address-of-record (URI). This in turn enables improved connection management and security association management when the connections/IP addresses are transient, such as when HTTPS tunneling is used. Although HTTPS will be discussed in certain examples herein, it will appreciated that the transient nature of the connections or IP addresses in those embodiments is not unique to that protocol, and thus the examples are merely illustrative and not limiting.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS

Figure 1:
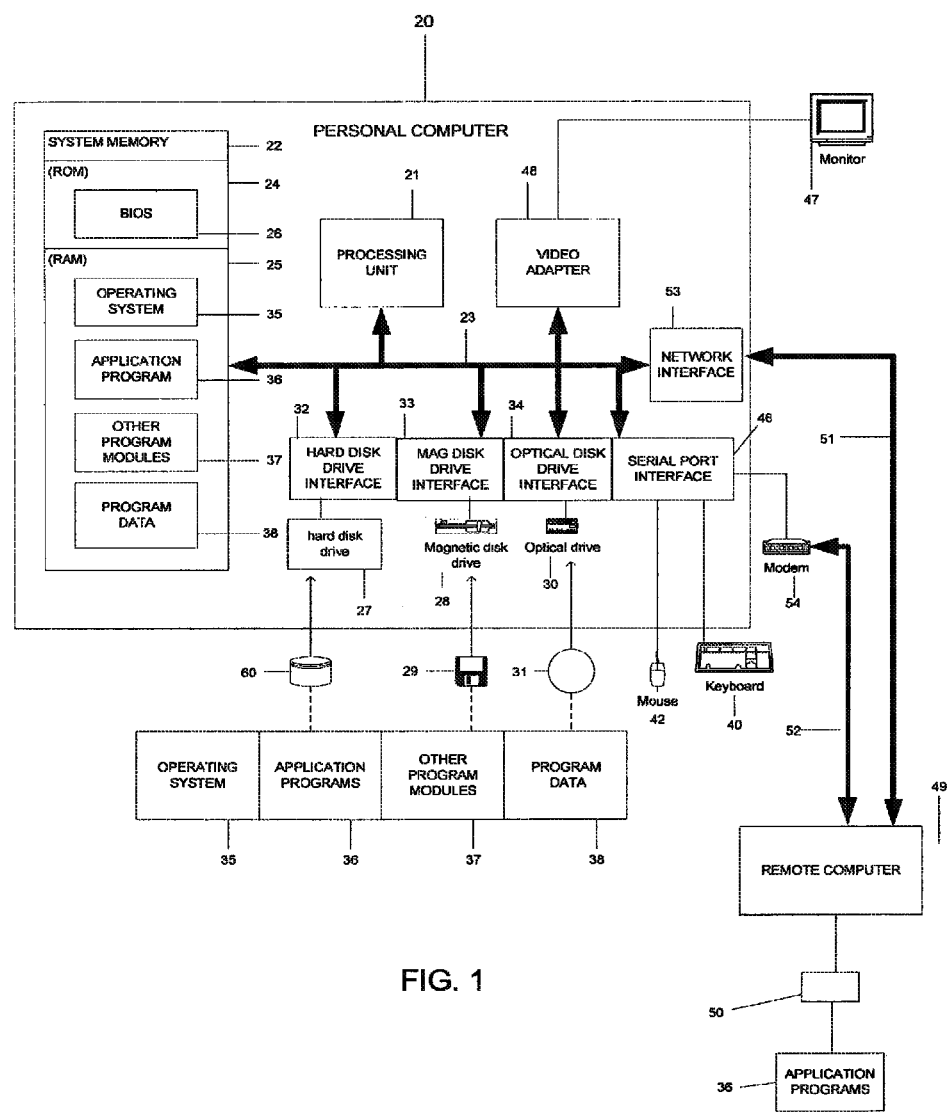
FIG. 1 is a is a block diagram generally illustrating an exemplary computer system on which embodiments of the invention may be implemented.

In some situations, it is beneficial to authenticate and identify incoming SIP messages and sign outgoing SIP messages. However, in order to this, there is a need to uniquely identify SIP devices such that connection management and security association management is improved.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2-6. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 preferably operates in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. Examples of such devices according to certain embodiments of the invention will be described below. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. Program modules depicted relative to the personal computer 20, or portions thereof, may be stored in the remote memory storage device if such is present. It will be appreciated that the network connections shown are exemplary and other means of establishing a communications link between the computers may be used in embodiments of the invention.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
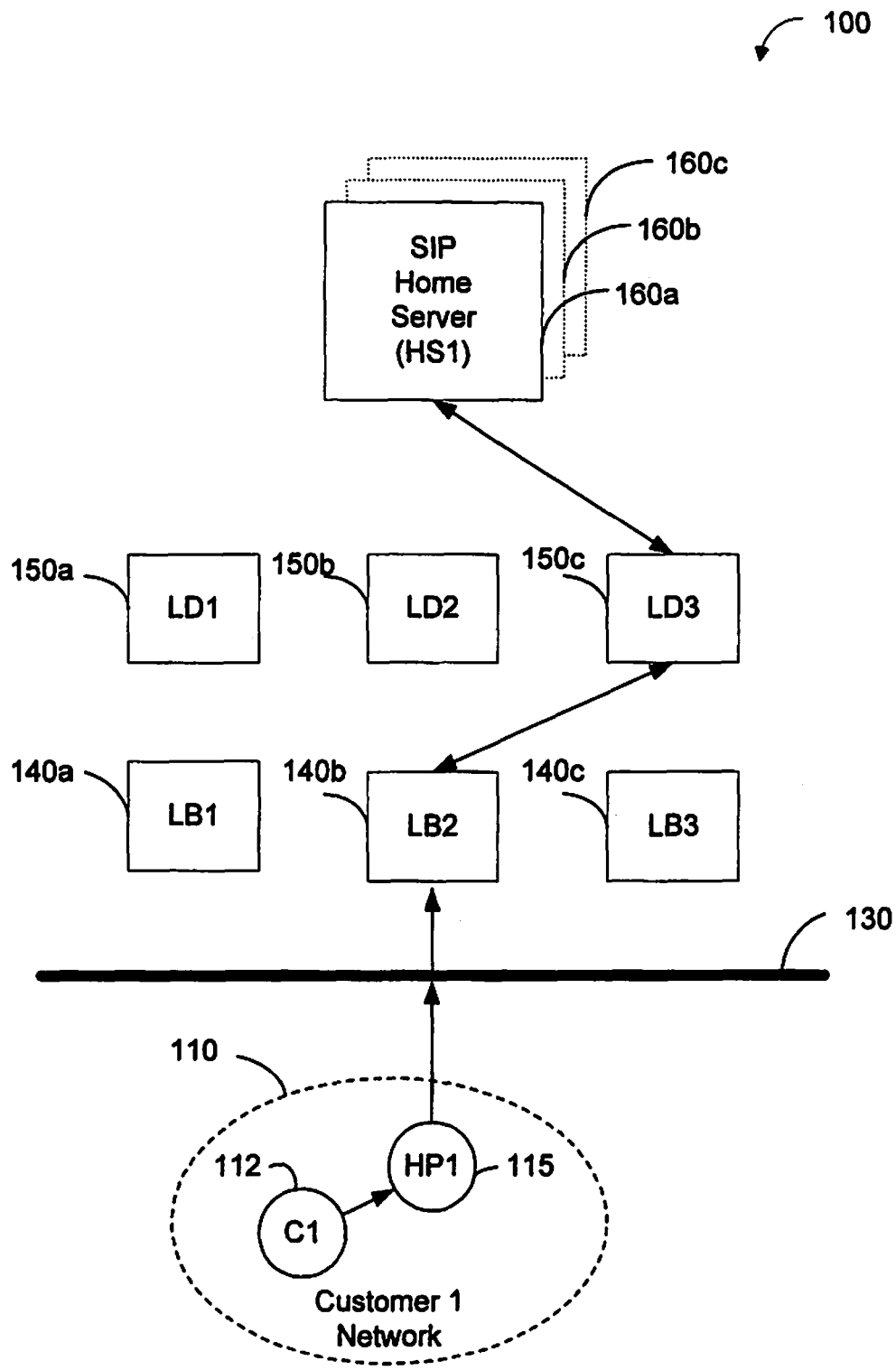
FIG. 2 is a schematic diagram showing a Session Initiation Protocol (SIP) system including an SIP client (C1), a proxy server (HP1), load balancers (LB1, LB2 and LB3), load distributors (LD1, LD2 and LD3) and SIP registrars (HS1, HS2 and HS3) in which aspects of embodiments of the invention may be incorporated.

Referring now to FIG. 2, the present invention is directed to a mechanism for integrating a unique End Point Identifier into an incoming request message under the Session Initiation Protocol (SIP), e.g. to enable an SIP registrar (hereinafter referred to as a "home server") 160*a-c* to respond to a request from an SIP client (C1) 112 using the same connections on the same route as that used by the SIP client (C1) 112 to initiate the connection. The SIP End Point Identifier is defined in an Internet Engineering Task Force (IETF) Request For Comments (RFC) 3261, which is hereby incorporated by reference in its entirety. IETF RFC 2543 is also instructive with respect to the Session Initiation Protocol, and is also incorporated herein by reference in its entirety.

By way of example, as shown by the topology in FIG. 2, in a session initiation operation, a client (C1) 112 (in customer 1's network 110) that registers with an SIP home server 160*a-c* sends an incoming request message (e.g., SUBSCRIBE message) to the SIP home server 160*a-c*. The incoming request message travels over a computer network comprising a number of components such as load balancers 140*a-c* and load distributors 150*a-c*. Note that although the REGISTER and SUBSCRIBE methods are sometimes used as examples herein, the described embodiments apply as well to any other SIP method, including but not limited to NOTIFY, BYE, ACK, CANCEL, INVITE, REFER, MESSAGE, INFO, OPTIONS, PRACK, UPDATE, and PUBLISH.

The load balancers 140*a-c* are typically IP-level load balancers while the load distributors 150*a-c* are typically application-level entities. Load distributors as discussed herein preferably embody a "location service" as described in the SIP protocol specification (RFC 3261). A common deployment is to have the client (C1) 112 use the HTTP proxy server (HP1) 115 to make an outbound HTTPS connection to one of the IP based load balancers 140*a-c* after passing through a firewall 130. As depicted in FIG. 2, a connection is made with Load Balancer (LB2) 140*b*. The Load Balancer (LB2) 140*b* then makes an HTTPS connection to one of the SIP based Load Distributor servers 150*a-c*. As depicted in FIG. 2, a connection is made between Load Balancer (LB2) 140*b* and Load Distributor (LD3) 150*c*. The Load Distributor (LD3) 150*c* subsequently looks up the home server for the client (C1) 112, such as via a directory service such as an ACTIVE DIRECTORY®, a product of Microsoft Corp. of Redmond, Wash. Alternatively, the Load Distributor (LD3) 150*c* may use LDAP, an external database, an in-memory database, or some other external data source to acquire this information. Thereafter, the Load Distributor (LD3) 150*c* makes a TCP connection to the SIP home server (HS1) 160*a* and forwards the incoming request message.

With the use of the End Point Identifier, also referred to as the "epid" or "End-point ID," the outgoing response message from the SIP home server (HS1) 160*a* is then sent back to the client (C1) 110 using the same connections on the same route even in situations where the firewall 130 or proxy server 115 drops the connection. According to the present invention, the epid parameter is used in conjunction with the user URI (i.e., "Uniform Resource Identifier") to uniquely identify an end point device in the system. A device can be any user agent or SIP client. In one embodiment of the invention, the epid parameter is generated by the end point device.

Alternatively, the epid parameter is supplied by a server. In this embodiment, the epid is typically supplied by the registrar (e.g. home server (HS1) 160*a*) for the user. In this embodiment, the epid value can for example be returned to the client (C1) 110 in the 200 OK response to a request such as a REGISTER request, to then be used by the client (C1) 110 in future communications.

To obtain the benefits of the epid solution across a client reboot, the epid parameter for a device is stored persistently. According to the present invention, generation of the epid parameter occurs the first time the client is initialized for a given user URI and should be saved for subsequent uses of the client by that user. As the epid is associated with a particular user URI, the epid parameter should be stored along with this user URI. The epid is not meaningful by itself; typically its uniqueness is only assured in combination with a user URI.

To be effective, the epid value is preferably unique for each end-point for a user. According to the present invention, the epid parameter can be any encoded string or substantially random value (i.e. either random or generated by a technique such as hashing that typically ensures a low probability of closely spaced repeat values if any) that follows the syntax of a "token." Using a sufficiently random value reduces the likelihood of collisions where two end points chose the same end-point value. In one embodiment of the invention, the epid parameter is an 8 character hex encoded string of an unsigned 32-bit random value. In another embodiment, the epid parameter is a hex encoding of the 48-bit MAC address of the device. The persistence and substantial uniqueness of the MAC address ensures that the associated hex encoded string is persistently associated with a particular device and is substantially unique.

After generation, the epid is used as a parameter of the SIP header. In one embodiment of the invention, the epid is used as a parameter of the SIP From: or To: header. It is the responsibility of the client to select/generate an epid and insert the epid parameter in the From: header of each request it generates, such as the REGISTER request. The SIP specification ensures that the epid parameter is copied to the From: header of the response message for the request. Copying the epid parameter allows the originator's epid parameter to be available in both directions and end-to-end along the signaling path.

An example of this usage of the epid parameter is:
   From:   "Bob"<sip:bob@domain.com>;tag=342994;
      epid=2a56e788

In this example, the epid parameter is outside the angle brackets. The epid parameter is intended to be a unique identifier for an end point of the user in the From: or To: URI depending on which header the epid is present in. According to the present invention, the epid parameter is the same across all SIP sessions for this end point even if the tag parameter is different for each SIP session. In one embodiment of the invention, the epid parameter is treated as an opaque token by the receiving party. Alternatively, the epid parameter is case-insensitive.

The epid parameter provided at registration time in the From: will be inserted by the registrar in the To: header on behalf of the client when routing requests to that client. In general, the originator of a request will not know the epid for the end point of the destination of the request. The registrar inserts the parameter when it routes the request to the destination allowing downstream proxies to take advantage of this information. In one example, in user-to-user sessions established using the INVITE method, the registrar copies the intended recipient's epid into the TO header, aiding routers along the route in identifying security associations, and in executing other client-specific functions.

Figure 3:
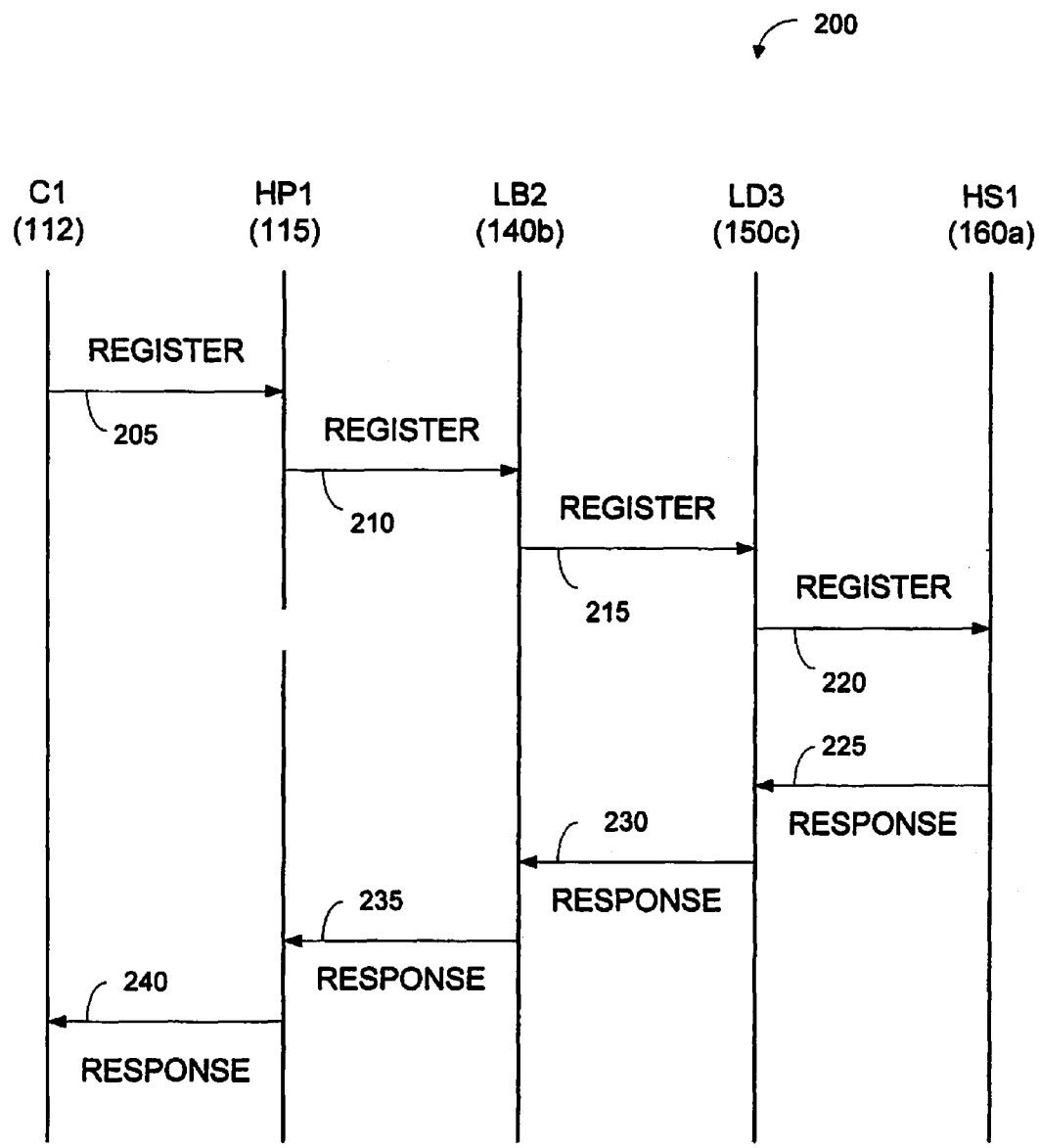
FIG. 3 is a schematic diagram showing exchange of signaling messages between an SIP client (C1) and the SIP registrar (HS1)

Turning to FIG. 3, a schematic diagram 200 showing an exemplary exchange of signaling messages between the SIP client (C1) 110 and the SIP home server (HS1) 160a (depicted in FIG. 2) according to an embodiment of the invention is illustrated. In one embodiment of the invention, when the SIP client (C1) 110 initiates registration with a Web site 112 (e.g., the Acme Co. network), it does a Domain Name System (DNS) server lookup for sip.acmeco.net and obtains the IP address for the SIP home server (HS1) 160a. Since Acme Co. publishes all of its front end servers in the DNS, it is possible that the SIP client (C1) message may pass through many servers (e.g., proxy servers, load balancing servers, load distributor servers) before reaching the home server (HS1) 160a.

As depicted in FIGS. 2 and 3, the incoming request message from SIP client (C1) 110 passes through Proxy server (HP1) 115 via path 205. Alternatively, the incoming request message passes through a forwarding proxy in the customer network. As described above, the Proxy server (HP1) routes the incoming request message to one of the load balancing servers 140a-c, in particular, Load Balancer (LB2) 140b via path 210. Load Balancer (LB2) then routes the incoming request message to one of the load distributor servers 150a-c, in particular, Load Distributor (LD3) 150c via path 215. Load Distributor (LD3) 150c looks up the home server information for client (C1) 112 and proxies the request to client C1's home server (HS1) 160a via path 220.

According to one aspect of the invention, the Load Distributor (LD3) 150c has Record-Route enabled so that it adds itself to the incoming request message. As such, the route for registration at the IP layer is C1-HP1-LB2-LD3-HS1 whereas at the SIP layer it is C1-LD3-HS1 because the proxy server (HP1) and Load Balancer (LB2) are not SIP servers. Using the route information ensures that the return path through the various network components is the same as the original path from the client (C1) 112 to the home server (HS1) 160a.

To accomplish this goal, client (C1) 112 generates an epid and inserts the epid in the From field to uniquely identify client (C1) 112 from other clients. The epid allows the home server (HS1) 160a to uniquely identify each instance of the client (C1) 112 that registers with the home server (HS1) 160a. In one embodiment of the present invention, the client (C1) 112 will also use the epid as a tag value for uniquely identifying the registration session. In another embodiment of the invention, the client (C1) 112 uses the same epid across instantiations for the same profile. Alternatively, if persistence is difficult across instantiations, the client (C1) 112 generates a new epid every time for every instantiation.

An example of usage of the epid parameter in a REGISTER request message sent from the client (C1) 112 to the Load Distributor (LD3) 150c is:

```
REGISTER sip:sip.tradewinds.net SIP/2.0
To: C1 <sip:C1@tradewinds.net>;epid=2af5c32b
From: C1 <sip:C1@tradewinds.net>;tag=T1C1;epid=2af5c32b
Call-ID: 1
CSeq: 1 REGISTER
Contact: <sip:10.1.1.1:2734;transport=TLS>
Max-Forwards: 70
Expires: 300
```

As can be seen from this example, the epid parameter generated and added to the header is 2af5c32b. After the Load Distributor (LD3) 150c receives the incoming request message, with the Record-Route enabled, the Load Distributor (LD3) 150c adds a Record-Route header to the REGISTER request message. An example of usage of the epid parameter in a REGISTER request message sent from the Load Distributor (LD3) 150c to the home server (HS1) 160a is:

```
REGISTER sip:sip.tradewinds.net SIP/2.0
To: C1 <sip:C1@tradewinds.net>;epid=2af5c32b
From: C1 <sip:C1@tradewinds.net>;tag=T1C1;epid=2af5c32b
Call-ID: 1
CSeq: 1 REGISTER
Contact: <sip:10.1.1.1:2734;transport=TLS>
Record-Route:
<sip:LD1.tradewinds.net:1234;transport=TCP>
Max-Forwards: 69
Expires: 300
```

To send an outgoing response message from home server (HS1) to the client (C1), the header information is parsed to identify the route information.

Figure 4:
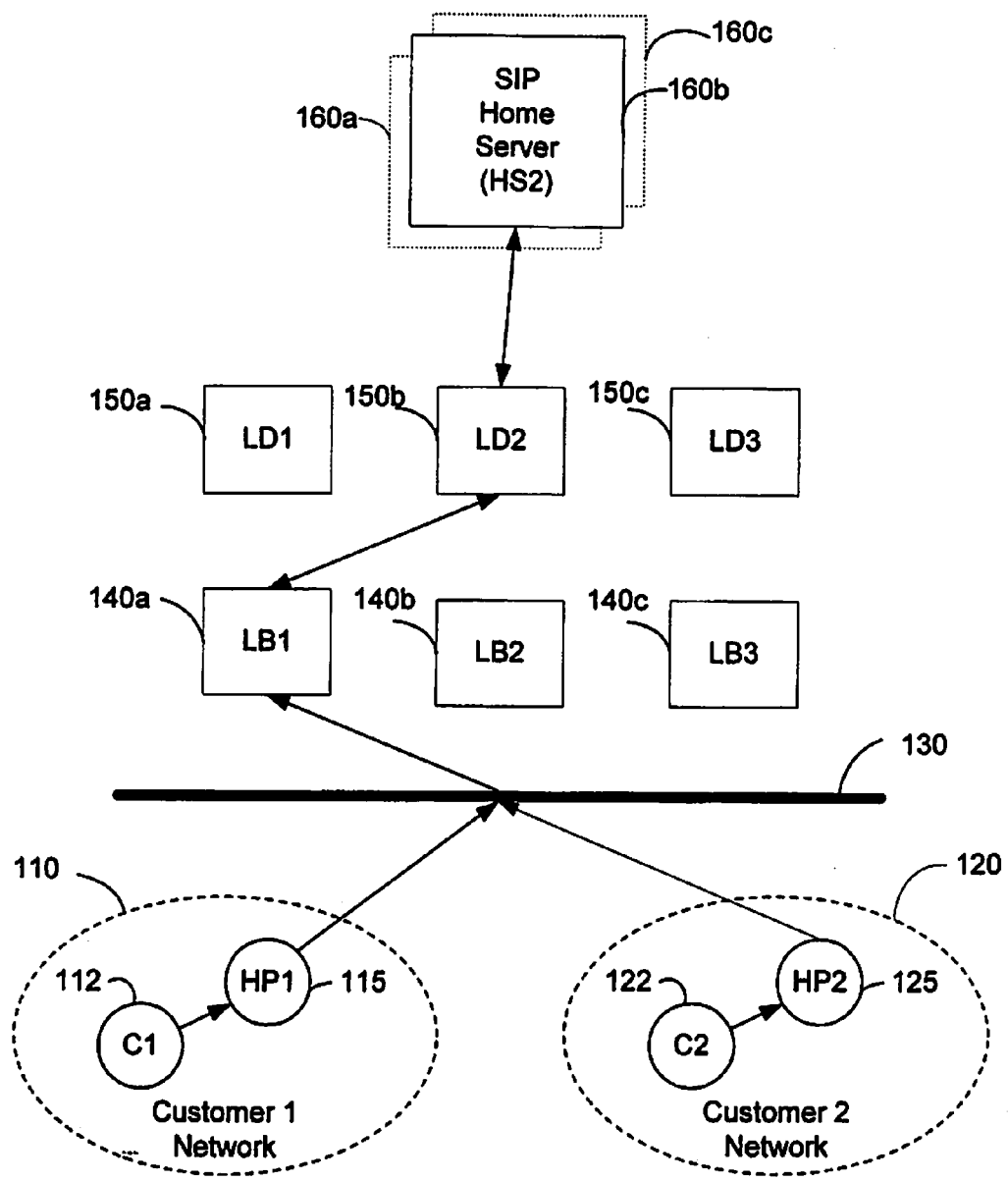
FIG. 4 is a schematic diagram showing a Session Initiation Protocol (SIP) system including SIP clients (C1 and C2), proxy servers (HP1 and HP2), load balancers (LB1, LB2 and LB3), load distributors (LD1, LD2 and LD3) and SIP registrars (HS1, HS2 and HS3) in which aspects of embodiments of the invention may be incorporated.
Figure 5:
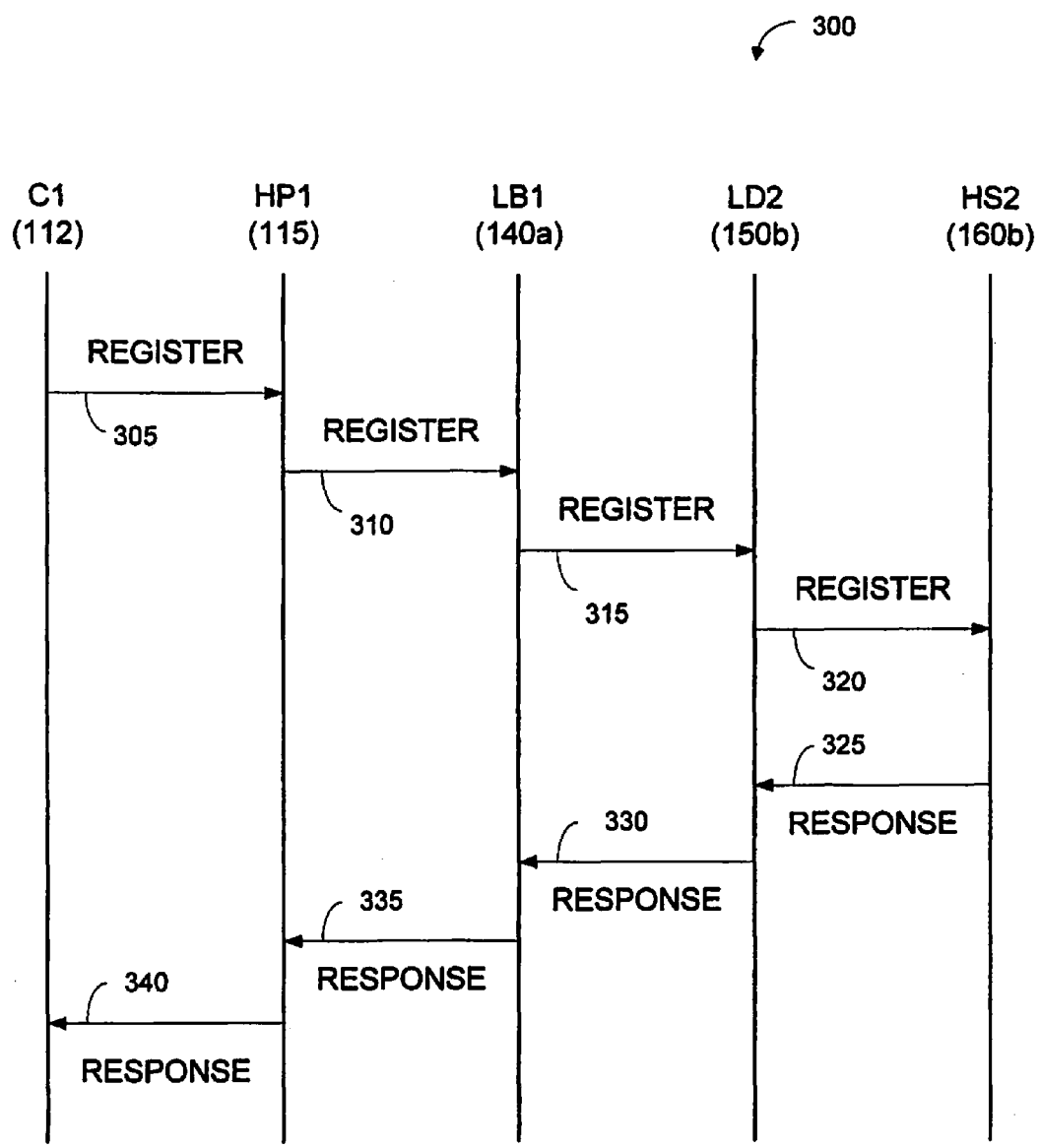
FIG. 5 is a schematic diagram showing exchange of signaling messages between an SIP client (C1) and an SIP registrar (HS2)

Turning to FIG. 4, in a session subscription operation, a client (C1) 112 in customer 1's network 110 has on its buddy list a client (C2) 122 in customer 2's network 120. A SUBSCRIBE message is sent by client (C1) using the same steps as that described for the registration scenario explained with reference to FIGS. 2 and 3. The SUBSCRIBE request follows the same route as that for registration, namely client (C1) 112 routes the SUBSCRIBE request to the proxy server (HP1) 115 which routes the request to the Load Balancer (LB1) 140a which, in turn, routes the request to the Load Distributor (LD2) 150b. The Load Distributor (LD2) 150b then routes the request to the home server (HS2) 160b for client (C2) 122. The Load Distributor (LD2) 150b preferably has Record-Route enabled so that it adds its route information to the SUBSCRIBE request.

To build the SUBSCRIBE message, the client (C1) 112 uses the epid generated previously in the registration function, namely 2af5c32b, and inserts the epid along with a tag into the From field of the header. Using the same epid allows the home sever (HS1) 160a of the client (C1) 112 to identify the instance of the client that the message (i.e., NOTIFY message) needs to be sent to. The PAS uses the existence of the epid parameter in the From: header as an indication that NOTIFY messages for this subscription should be routed via the home server (HS1) 160*a* for client (C1) 112.

The home server (HS1) 160*a* also uses the SIP user URI of the user instead of the IP address in the contact field because routing of NOTIFY messages associated with this SUBSCRIBE is done based on the current registration state of the client and not based on the IP address of the client at the time the SUBSCRIBE was sent.

An example of usage of the epid parameter in a SUBSCRIBE request message sent from the client (C1) 112 to the Load Distributor (LD1) 150*a* is:

```
SUBSCRIBE sip:C2@tradewinds.net SIP/2.0
To: C2 <sip:C2@tradewinds.net>
From: C1 <sip:C1@tradewinds.net>;tag=T2C1;epid=2af5c32b
Call-ID: 2
CSeq: 1 SUBSCRIBE
Event: Presence
Contact: <sip:C1@tradewinds.net>
Max-Forwards: 70
Expires: 21600
```

In this case, no record-routing is required since the contact address of the client was set to point back to the home server. Since the route recorded for the Registration is used for routing messages, there is no need to Record-Route other requests. The Proxy can be configured such that it inserts Record-Route for REGISTER requests only, such as for use with the RTC registrar. An example of usage of the epid parameter in a SUBSCRIBE request message sent from the Load Distributor (LD2) 150*b* to the home server (HS2) 160*b* is:

```
SUBSCRIBE sip:C2@tradewinds.net SIP/2.0
To: C2 <sip:C2@tradewinds.net>
From: C1 <sip:C1@tradewinds.net>;tag=T2C1;epid=2af5c32b
Call-ID: 2
CSeq: 1 SUBSCRIBE
Event: Presence
Contact: <sip:C1@tradewinds.net>
Max-Forwards: 69
Expires: 21600
```

According to one aspect of the invention, when the presence state of client (C2) 122 changes, client (C2) 122 updates its presence state using a SERVICE request to its home server (HS2) 160*b*. Home server (HS2) 160*b* sends NOTIFY messages to all watchers of client (C2) 122 which includes client (C1) 112. The home server (HS2) 160*b* looks up the contact for client (C1) 112 in order to send the NOTIFY message. In one embodiment, the home server (HS2) 160*b* finds that the contact is associated with an epid parameter from the From header. This indicates that the NOTIFY message is sent to the home server (HS1) 160*a* for client (C1) 112 instead of using the Route specified in the SUBSCRIBE request. The home server (HS2) 160*b* looks up the home server for client (C1) 112 and finds that it is home server (HS1) 160*a*. The home server (HS2) uses the Contact field that was received in the SUBSCRIBE request for the Request-URI of the NOTIFY message. The home server (HS2) then inserts the epid from the SUBSCRIBE request into the To: header of the NOTIFY and routes the NOTIFY message to home server (HS1) 160*a*.

When the Load Distributor (LD2) 150*b* does a lookup for the home server of client (C2) 122, it looks up the home server for client (C1) 112 as well and inserts it as a parameter in the SUBSCRIBE request before routing it to home server (HS2) 160*b*. This is an optimization to avoid looking up the home server for C1 when routing the NOTIFY request. An example of usage of the NOTIFY message sent by home server (HS2) 160*b* to home server (HS1) 160*a* is:

```
NOTIFY sip:C1@tradewinds.net
To: C1 <sip:C1@tradewinds.net>;tag=T2C1;epid=2af5c32b
From: C2 <sip:C2@tradewinds.net>
Call-ID: 2
CSeq: 2 NOTIFY
Event: Presence
Max-Forwards: 70
```

In an embodiment of the invention, when the home server (HS1) 160*a* receives the NOTIFY message, it takes the Request-URI of the NOTIFY message and looks up the Registration database for all contacts registered for that SIP URI. When the home server (HS1) 160*a* finds a match, it compares the epid in the To of the NOTIFY message with each contact registered for that URI. When the epids match, the home server (HS1) 160*a* routes the NOTIFY using the Route stored in the Registration information for that contact. The home server (HS1) 160*a* then inserts the Route header with the contact information for client (C1) 112 received in the REGISTER request. In this case, the NOTIFY message is routed from home server (HS1) 160*a* to Load Distributor (LD2) 150*b* to Load Balancer (LB1) 140*a* to the proxy server (HP1) 115 and then to client (C1) 112.

Thereafter, the home server (HS2) 160*b* preserves the From tag received in the SUBSCRIBE request and places it in the To field of the NOTIFY request. In this manner, the client can identify the SUBSCRIBE session to which the NOTIFY belongs. The home server (HS2) 160*b* also preserves the epid parameter from the From field in the SUBSCRIBE request and places it in the To field of the NOTIFY request. If there are multiple clients for client (C1) 112 that have sent a SUBSCRIBE to the home server (HS2) 160*b*, then the home server (HS2) 160*b* sends a NOTIFY for each instance of the client. Each instance of the client is uniquely identified by the epid parameter from the From field of the SUBSCRIBE request.

An example of usage of the NOTIFY message sent by the home server (HS1) 160*a* to the Load Distributor (LD2) 150*b* is:

```
NOTIFY LD1.tradewinds.net:1234;transport=TCP SIP/2.0
To: C1 <sip:C1@tradewinds.net>;tag=T2C1;epid=2af5c32b
From: C2 <sip:C2@tradewinds.net>
Route: <sip:10.1.1.1:2734;transport=TLS>
Call-ID: 2
CSeq: 2 NOTIFY
Event: Presence
Max-Forwards: 69
```

When the Load Distributor (LD2) 150*b* receives the request, it rewrites the Request-URI with the Route header in the NOTIFY and routes the request over the same TLS connection that the client initiated when doing the registration. This connection is located using the epid parameter in the To: header as shown here:

```
NOTIFY sip:10.1.1.1:2734;transport=TLS SIP/2.0
To: C1 <sip:C1@tradewinds.net>;tag=T2C1;epid=2af5c32b
From: C2 <sip:C2@tradewinds.net>
Call-ID: 2
CSeq: 2 NOTIFY
```

-continued

```
Event: Presence
Max-Forwards: 68
```

Figure 6:
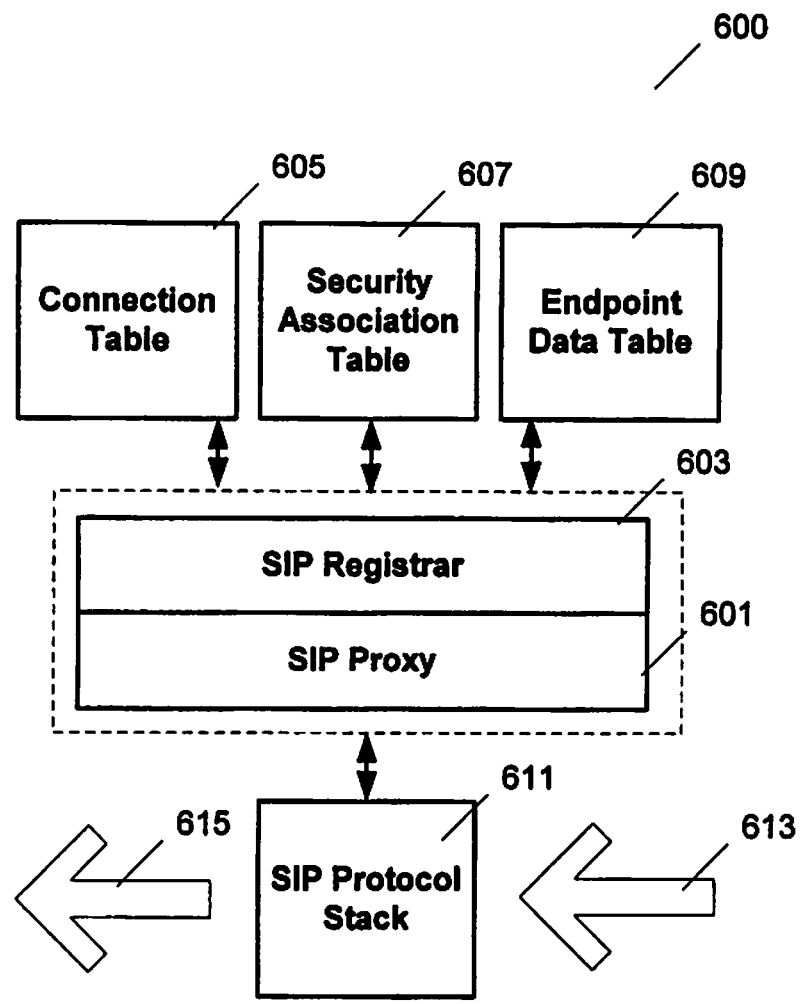
FIG. 6 is a schematic diagram showing an exemplary RTC server architecture for using an EPID via SIP according to an embodiment of the invention.

An exemplary RTC server architecture 600 for using an epid via SIP according to an embodiment of the invention is illustrated in greater detail in the schematic diagram of FIG. 6. The architecture is implemented in a number of portions. The primary portion of the architecture is the SIP Proxy 601. At the SIP Proxy 601, the epid parameter is used to identify a security association between the device endpoint and the proxy. This security association is used to sign outgoing messages and to verify the signature of incoming messages when appropriate.

Above the proxy layer 601 is an application, the registrar 603, which also makes use of the epid parameter. Since the epid parameter uniquely identifies an endpoint for a given user, the registrar 603 examines this parameter to easily determine whether or not a given request comes from an endpoint it has previously seen. This allows the registrar 603 to make policy decisions regarding whether to allow the request or not. It also allows the registrar 603 to determine the proper signaling path (connection) that it should use for forwarding requests destined to a given user. This is particularly valuable in a situation where the connection may be changing rapidly due to unreliable network conditions or otherwise. Thus, the epid information is especially important for connection management in environments that make use of NATs, firewalls, and DHCP.

The proxy 601 and/or the registrar 603 maintain a set of tables to aid in connection management. In particular, in an embodiment of the invention, the tables include a connection table 605, a security association table 607, and an endpoint data table 609. Each table is indexed by user URI and epid. These tables allow the proxy 601 and the registrar 603 to modify their operation to account for plurality, capability, and presence of the devices associated with each user. Finally, at the lowest level, the proxy 601 and registrar 603 interface with the SIP protocol stack 611 which is responsible for receipt of incoming messages 613 and transmission of outgoing messages 615.

It should be noted that although the discussion has primarily focused on the use of epids by client devices, the same basic technique can provide numerous benefits when applied to servers as well. For example, each server may insert its own epid value in a Record-Route or Route header, such as, for example:

Route:<sip:proxy.domain.com>;lr;epid=4353536. Use of an epid parameter in this manner confers benefits distinct from those conferred by the use of epids with respect to clients. For example, use of server epids allows a stateful server to indicate when it has rebooted and lost its prior state. Moreover, server epids can provide unique identification of a server, such as when that server is just one of a plurality of servers in a cluster having a single common "virtual" IP address.

In addition, the use of server epids facilitates classification of a connection by a server as belonging to a group of connections that should be treated identically from the perspective of a peer connecting to that server. Finally, use of server epids allows a peer of a server to reuse an existing connection to that server, even if the destination IP address of the server is different, such as when the server is multi-homed or has multiple NICs.

It will be appreciated that the unique mechanism described herein allows functionality beyond that permitted by using a device's IP address as its identifier. For example, the device's IP address can change, as in the case of a reboot, but the device identifier formed of the user identifier and the epid can remain the same in such situations. Moreover, while tying a security association to an IP-level communication address will cause the SA to be lost when the communication address changes dynamically, the epid allows re-use of an existing SA for situations where the device and user credentials have not changed.

Moreover, according to a further embodiment of the invention, use of the epid allows independent send and receive communication addresses, such as when using TCP as a transport over different send and receive ports. In this case, an endpoint maintains two separate Session Initiation Protocol stacks, having two endpoint identifiers, so that one stack is used for sending and the other is used for receiving.

In an embodiment of the invention, the epid also allows a distinction between multiple and single point of presence for a user, such as when a registrar/presence agent server chooses to enforce policies that restrict a user to having only a single point of presence. In such a situation, the epid allows the registrar to distinguish between a user with multiple registered clients and a user who has registered the same client multiple times with a different communication address.

The epid moreover allows the originator of a request to target a specific destination device in an embodiment of the invention and allows a device to specify that future communications within a dialog should go directly to that device even in situations where the actual communication address for that device changes over time. Finally, the epid also supports reliable communications over potentially transient HTTPS connections in an embodiment of the invention. In particular, the remote end of a TLS connection can use the epid to determine the appropriate connection to use when forwarding messages, even when the connection is broken and re-established.

Illustrative embodiments of the present invention and certain variations thereof have been provided in the Figures and accompanying written description. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A method comprising:
receiving a Session Initiation Protocol compliant request at a receiving endpoint from a transmitting endpoint, the Session Initiation Protocol compliant request including an endpoint identifier and user information, wherein a combination of the endpoint identifier and the user information uniquely identifies the transmitting endpoint within a network independently of an Internet Protocol (IP) address of the transmitting endpoint.

2. The method of claim 1, wherein the Session Initiation Protocol compliant request is constructed at the transmitting endpoint.

3. The method of claim 1, wherein the endpoint identifier is an encoded string representing a hardware address of the transmitting endpoint.

4. The method of claim 1, wherein the request is associated with a SIP method selected from the group of methods consisting of:
REGISTER;
SUBSCRIBE;
NOTIFY;
BYE;
ACK;
CANCEL;
INVITE;
REFER;
MESSAGE;
INFO;
OPTIONS;
PRACK;
UPDATE; and
PUBLISH.

5. The method of claim 1, wherein the endpoint identifier is generated by a registrar remote from the transmitting endpoint.

6. The method of claim 1, further comprising, after receiving the Session Initiation Protocol compliant request, transmitting subsequent communications from the receiving endpoint to the transmitting endpoint.

7. The method of claim 6, wherein the transmitting endpoint is among a plurality of endpoints associated with the user information.

8. The method of claim 1, wherein the Session Initiation Protocol compliant request is received from the transmitting endpoint via a proxy server.

9. The method of claim 1, wherein the user information includes a uniform resource identifier associated with the user.

10. The method of claim 1, further comprising transmitting a response to the request using a transmission address, wherein the transmission address comprises the endpoint identifier.

11. A system comprising:
a transmitting endpoint comprising:
a processing unit;
a memory operatively connected to the processing unit and storing instructions executable on the processing unit, the instructions causing the transmitting endpoint to, when executed:
construct a Session Initiation Protocol compliant request for transmission to a receiving endpoint, the Session Initiation Protocol compliant request including an endpoint identifier and user information, wherein a combination of the endpoint identifier and the user information uniquely identifies the transmitting endpoint within a network independently of an Internet Protocol (IP) address of the transmitting endpoint; and
transmit the request to a receiving endpoint.

12. The system of claim 11, further comprising the receiving endpoint positioned remotely from the transmitting endpoint, the receiving endpoint communicatively connected to the transmitting endpoint.

13. The system of claim 12, further comprising a proxy server communicatively connected between the transmitting endpoint and the receiving endpoint.

14. The system of claim 11, wherein the Session Initiation Protocol compliant request includes routing information describing a path between the transmitting endpoint and the receiving endpoint.

15. The system of claim 11, wherein the transmitting endpoint is further configured to generate the endpoint identifier.

16. The system of claim 11, wherein the transmitting endpoint comprises a server.

17. The system of claim 16, wherein the server includes a plurality of network interfaces, and wherein the endpoint identifier is associated with one of the plurality of network interfaces.

18. The system of claim 11, wherein the transmitting endpoint comprises a client device.

19. The system of claim 11, wherein the request is transmitted to the receiving endpoint via a HTTPS connection.

20. A computer-readable storage medium comprising computer executable instructions stored thereon which, when executed by a computing system acting as a transmitting endpoint, cause the computing system to perform a method comprising:
constructing a Session Initiation Protocol compliant request for transmission to a receiving endpoint, the Session Initiation Protocol compliant request including an endpoint identifier and user information, wherein a combination of the endpoint identifier and the user information uniquely identifies the transmitting endpoint within a network independently of an Internet Protocol (IP) address of the transmitting endpoint; and
transmitting the request to a receiving endpoint.

* * * * *